2,778,814

ALKYL ARYL SULFONIC ACID AMINE SALT EMULSIFYING AGENTS

Robert William Behrens, Newport, Del., and William Colvin Griffin, West Chester, Pa., assignors to Atlas Powder Company, Wilmington, Del., a corporation of Delaware No Drawing. Application November 7, 1952, Serial No. 319,428

5 Claims. (Cl. 260—98)

This invention relates to surface active organic salts and particularly to hydroxy-polyoxyethylene-amine salts of alkyl aryl sulfonic acids.

It is an object of the invention to provide novel surface active compounds.

A further object is to provide hydroxy-polyoxyethylene-amine salts of alkyl aryl sulfonic acids.

A still further object is to provide emulsifiers which are effective in both hard and soft water.

The above and other objects will be apparent in the course of the following description and in the appended claims.

Salts of the alkyl aryl sulfonic acids are well recognized as surface active agents, and have been employed as detergents, wetting agents, penetrants, emulsifiers and the like. Among the salts so proposed in the prior art have been the alkali-metal salts, ammonium salts, salts of the lower aliphatic amines and salts of the lower alkylol amines.

The said prior art salts are especially effective as detergents and are probably more widely used in that field than any other. As emulsifiers, however, they have a disadvantage common to most anionic surface active agents in that their effectiveness is impaired by hardness in the water employed in the aqueous phase of the emulsions. In distilled water or soft water they perform satisfactorily, but in waters containing calcium and/or magnesium hardness their effectiveness is greatly lowered. This is an especially serious disadvantage in the field of agricultural emulsions where the logical method of procedure is to prepare emulsifiable concentrates of solvent and agricultural chemical containing an emulsifier, said concentrate to be diluted with water to form an emulsion at the point of use. Concentrates so prepared need to be usable with waters of widely varying properties, since the water for dilution will usually be taken from the most convenient source, whether it be comparatively soft surface water, or hard deep-well water. The emulsifiable concentrate must form uniformly stable emulsions regardless of the nature of the diluting water.

In accordance with the present invention salts of alkyl aryl sulfonic acids are provided which overcome the above-described disadvantage. They are salts of alkyl aryl sulfonic acids containing from 8 to 16 carbon atoms in the alkyl radical, wherein the aryl radical may be any simple aromatic residue. Preferably the aryl radical is that of benzene and the alkyl radical contains 12 carbon atoms.

The neutralizing bases employed to form the salts of the invention are polyoxyethylene derivatives of amines containing a hydrocarbon radical of from 12 to 20 carbon atoms, and containing from 3 to 30 oxyethylene groups. They may be designated by the generic formula

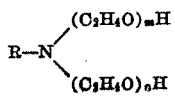

wherein R is a hydrocarbon radical containing from 12 to 20 carbon atoms, $m$ and $n$ are each at least 1, and the sum of $m+n$ is from 3 to 30. Specifically, R may represent an aliphatic hydrocarbon radical, saturated or unsaturated, branched or straight chain such, for example, as lauryl, myristyl, oleyl, stearyl, or branched chain radicals corresponding to those obtained by polymerizing the lower olefines into units of from 12 to 20 carbon atoms; or it may represent a radical containing one or more isocyclic nuclei, such for example, as octyl phenyl, or cyclohexyl phenol, or dodecyl tolyl; or it may represent a radical containing condensed isocyclic rings, such for example, as butyl naphthyl, or abietyl, or dihydroabietyl, or dehydroabietyl amine, or other rosin amine. Equally suitable are polyoxyethylene derivatives of mixed amines such as may be obtained in known manner from the fatty acids of naturally occurring fats and oils by amidation and reduction. In such compounds R represents mixtures of aliphatic hydrocarbon radicals corresponding to the mixtures of long chain radicals occurring, for example, in coconut oil, soya bean oil, tallow, cottonseed oil, and the like. These mixed amines may be called generically "fatty amines." If the many polyoxyethylene amines disclosed above a preferred group includes the polyoxyethylene rosin amines and the polyoxyethylene fatty amines containing from 10 to 15 oxyethylene groups per mol of amine.

Following is an illustrative list of salts coming within the purview of the invention, in which list preferred compounds are marked with asterisks. In each salt listed the number hyphenated to the abbreviation OE (for oxyethylene) represents the sum of $m+n$ in the generic formula.

20–OE stearyl amine salt of hexadecyl benzene SO₃H
\*15–OE coconut fatty amine salt of dodecyl benzene SO₃H
10–OE soya fatty amine salt of octyl naphthelene SO₃H
30–OE oleyl amine salt of hexadecyl toluene SO₃H
\*10–OE dihydroabietyl amine salt of dodecyl benzene SO₃H
\*12–OE dehydroabietyl amine salt of dodecyl benzene SO₃H
10–OE octyl aniline salt of dodecyl xylene SO₃H
3–OE lauryl amine salt of octyl benzene SO₃H
5–OE tallow fatty amine salt of tetradecyl benzene SO₃H
\*15–OE tallow fatty amine salt of dodecyl benzene SO₃H
16–OE butyl naphthyl amine salt of hexadecyl benzene SO₃H
\*14–OE soya fatty amine salt of dodecyl benzene SO₃H
\*15–OE rosin amine salt of dedecyl benzene SO₂H
25–OE decyl naphthalene amine salt of decyl naphthalene SO₃H The list could be extended indefinitely, but the above is sufficient to illustrate the scope of the invention and the range of the compounds disclosed by the generic formula hereinbefore cited.

The salts of the invention may be prepared by the neutralization of the appropriate sulfonic acid with an approximately stoichiometric amount of an appropriate polyoxyethylene amine. The neutralization is preferably carried out in the presence of a volatile solvent to facilitate mixing of the acid and the base, after which mixing the solvent may be removed by evaporation. Sulfuric acid salts of the ether amines employed are objectionable impurities, and it is preferred to separate the excess of sulfonating acid from the sulfonic acid before neutralization. By way of specific illustration the following examples are cited.

*Example 1*

The sulfonation mixture obtained by reaction of 120 parts by weight of 20% oleum with 100 parts of dodecyl benzene in the temperature range of 115° to 130° F. is diluted with twice its volume of benzene, agitated thoroughly and then allowed to stand and separate into 2 layers. The bottom layer (spent sulfonating acid) is withdrawn and discarded. The acidity of a sample of the upper benzene solution layer is then determined by titration to a phenolphthalein end point with sodium hydroxide. To the remainder of the solution there is added 845 grams of 15-OE lauryl amine for each gram-equivalent of acid found in said solution by titration. The mixture is agitated and then the benzene removed by heating under reduced pressure. The resulting product is a dark colored, viscous liquid with good emulsifying properties in both soft and hard water.

A salt of less hydrophilic character is obtained by substituting for the 15-OE lauryl amine in the above example 405 grams of 5-OE lauryl amine. A salt more hydrophilic in character is obtained by employing 1505 parts of 30-OE lauryl amine in place of the 15-OE lauryl amine in the example as described.

*Example II*

The procedure of Example I is repeated employing 10-OE rosin amine as the neutralizing base in the proportion of 729 grams for each gram-equivalent of acid to be neutralized.

*Example III*

The mixture obtained by sulfonation reaction between 100 parts by weight of hexadecyl toluene and 153 parts by weight of 20% oleum under the conditions described in Example I is diluted with twice its volume of benzene and the spent sulfonating acid separated and discarded. The acidity of the sulfonic acid layer is determined by titration and the layer is neutralized by the addition of 1150 grams of 20-OE tallow fatty amine for each gram-equivalent weight of acid so found. After evaporation of the benzene a viscous, oily, surface active liquid remains which is an excellent emulsifier.

Instead of 1150 grams of 20-OE tallow fatty amine there may be substituted 909 grams of 16-OE octyl aniline, or 755 grams of 12-OE hexylnaphthyl amine, or 317 grams of 3-OE lauryl amine. In each case an emulsifying agent of remarkedly uniform effectiveness in waters of various hardness is obtained.

*Example IV*

The mixture obtained by the sulfonation of 100 parts by weight of octyl naphthalene with 113 parts by weight of 20% oleum is diluted with benzene and freed from spent sulfonating acid as in Examples I to III. The activity of the benzene layer containing dissolved sulfonic acid is determined by titration and the layer neutralized by the addition of 865 grams of 15-OE soya fatty amine per gram-equivalent of acid so found. As in the earlier examples evaporation of the benzene leaves behind an emulsifying agent especially suited for the preparation of agricultural emulsion concentrates.

The above examples are to be taken as illustrative only and not as defining the scope of the invention.

What is claimed is:

1. The salt of an alkyl aryl sulfonic acid, containing an alkyl radical of from 8 to 16 carbon atoms and no substituent other than alkyl, and a polyoxyethylene ether of an amine conforming to the generic formula

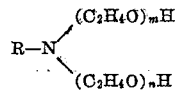

where R is a hydrocarbon radical containing from 12 to 20 carbon atoms, $m$ and $n$ are each at least 1 and the sum of $m+n$ is from 3 to 30.

2. The salt of an alkyl benzene sulfonic acid containing an alkyl radical of from 8 to 16 carbon atoms and no substituent other than alkyl, and a polyoxyethylene ether of an amine conforming to the generic formula

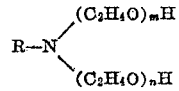

where R is a hydrocarbon radical containing from 12 to 20 carbon atoms, $m$ and $n$ are each at least 1 and the sum of $m+n$ is from 3 to 30.

3. A salt as in claim 2 wherein the said amine is selected from the group consisting of rosin amines and fatty amines, and wherein the number of oxyethylene groups is from 10 to 15.

4. A salt of dodecyl benzene sulfonic acid and polyoxyethylene rosin amine containing 10 oxyethylene groups.

5. A salt of dodecyl benzene sulfonic acid and polyoxyethylene tallow fatty amine containing 15 oxyethylene groups.

References Cited in the file of this patent

UNITED STATES PATENTS

| | | |
|---|---|---|
| 2,283,199 | Flett | May 19, 1942 |
| 2,469,493 | Barker | May 10, 1949 |
| 2,623,870 | Sanders | Dec. 30, 1952 |
| 2,686,201 | Keenan | Aug. 10, 1954 |
| 2,687,420 | Brady | Aug. 24, 1954 |

FOREIGN PATENTS

| | | |
|---|---|---|
| 467,571 | Great Britain | June 16, 1937 |